United States Patent [19]

Davidtz

[11] 3,996,696
[45] Dec. 14, 1976

[54] FLOCCULATION PROCESS

[75] Inventor: John C. Davidtz, East Amwell Township, Hunterdon County, N.J.

[73] Assignee: Mobil Oil Corporation, New York, N.Y.

[22] Filed: Nov. 19, 1975

[21] Appl. No.: 633,521

Related U.S. Application Data

[62] Division of Ser. No. 443,540, Feb. 19, 1974, Pat. No. 3,956,119.

[52] U.S. Cl. ..................................... 47/58; 61/35; 47/DIG. 10
[51] Int. Cl.² .......................................... E02D 3/14
[58] Field of Search ............. 47/58; 210/42, 47, 49, 210/52; 61/35

[56] References Cited
OTHER PUBLICATIONS

Ecology and Reclamation of Devastated Land, Hutnik et al., 1973, Gordon and Breach, N.Y.

*Primary Examiner*—Robert E. Bagwill
*Attorney, Agent, or Firm*—C. A. Huggett; M. G. Gilman; C. A. Malone

[57] ABSTRACT

The dilute clay-containing slimes waste, formed in the hydraulic mining of phosphate mineral, is flocculated by mixing with an aqueous extract of fertile topsoil or with fertile topsoil which is the uppermost 2 feet or more of overburden that contains at least 200 parts per million of organic matter extractable by water. Water is recovered from the flocculated mixture. The dewatered floc is preferably disposed at a land reclamation site and covered with overburden to restore the original stable soil profile, i.e. an upper layer of soil with good drainage and a lower layer having poor drainage.

2 Claims, No Drawings

FLOCCULATION PROCESS

This is a division of copending application Ser. No. 443,540, filed Feb. 19, 1974, now U.S. Pat. No. 3,956,119.

FIELD OF THE INVENTION

This invention relates to the mining of phosphate rock. It more particularly refers to means for the amelioration of byproduct waste disposal problems and to a method for reclaiming arable land.

PRIOR ART

Phosphate rock is mined by a strip mining process in which the overburden including fertile topsoil is stripped off to expose an ore-bearing layer commonly referred to as the "matrix". The ore-bearing layer is hydraulically worked to separate the phosphate salt mineral, which occurs as variously sized pebbles, rocks and small particles, from its natural mixture with clay and granular particles of quartz sand. The impure ore is transported hydraulically to an ore beneficiation area where it is separated from the clay and quartz and then it is rough graded, loaded upon suitable transportation and shipped to customers, usually fertilizer manufacturers.

There is formed, in the hydraulic operations, a phosphate slimes waste consisting of a dilute colloidal suspension of very small particle size (mostly −325 mesh) mixture of clay particles and phosphate salts. As produced, it has a low solids content of about 1 to 5 percent. The clays involved are hydrophilic and this fact coupled with their colloidal size and the particular climatic conditions in the geographic areas where phosphate ore is mined in the United States significantly retard the natural concentration of this slimes waste. It has been the practice in this industry for the past several decades to simply store these slimes in huge open areas. These storage ponds have been created by erecting dams elevated sometimes as much as 40 feet above ground, using a part of the overburden and part or all of the quartz "tailings" which are also a byproduct of ore beneficiation as the dam material. The slimes have simply been pumped into these ponds and allowed to sit for an indefinite time. It is interesting to note that, as made, the byproduct phosphate slimes waste has a solids content of about 1 to 5 percent; this increases to about 5 percent to 10 percent in up to about one month and only to about 20 percent in up to about 20 years. It is thought that eventually, although no one knows in how many years, the slimes will dewater to an extent sufficient to permit their use as agricultural fill. Meanwhile, however, thousands of acres of land inundated in this way are used to no sociological or economic advantage. Additionally, these dams must be continually patrolled, inspected and repaired and thus they represent a substantial liability to the phosphate mining industry.

Because of the seriousness of this problem, the phosphate-mining industry has long sought an acceptable solution. A number of proposals have been made involving such slimes disposal techniques as pressure filtration, selective flocculation, and dewatering by electroosmosis, but the industry today still resorts to containment in artificial ponds.

More recently, it has been proposed to enhance the rate of dewatering of phosphate slimes waste by incorporating therein a solids fraction known as "tailings". These tailings arise from a flotation step in the ore beneficiation process, and consist essentially of water insoluble granular particles of quartz sand. It has been proposed to use dewatered mixtures of tailings and slimes as reconstituted soil. These proposals are more fully described in U.S. Pat. No. 3,763,041, the contents of which are herein incorporated by reference.

Most phosphate deposits are found in areas that have for centuries supported the growth of vegetation such as grasses, shrubs, and trees. The terrain and the soil profile of these areas are stable, i.e. they are not subject to gross change in location, character or composition over a short span of years. In the state of Florida, where most of the phosphate deposits are found, the soil overlaying the deposits of phosphate minerals is of a sandy nature, slightly acidic, often contains some kaolin-type clays and exhibits good drainage. It is of some interest that clay chemists believe that kaolins form in well-drained, slightly acidic environments, consistent with the above description. It is this soil which overlays the deposit of phosphate minerals, and which may range in thickness up to about 30 feet, that is commonly referred to as overburden, and shall be so designated in this specification. A portion or all of this overburden often will contain substantial quantities of humic substances, and may be characterized as "fertile topsoil", a term which will be precisely defined in later paragraphs.

Preliminary to the recovery of phosphate ore, the overburden is stripped, usually by drag lines, to expose the so-called matrix, i.e. the deposit of phosphate rock and pebbles mixed with quartz sand and clay minerals. The phosphate, sand and clay are sometimes found in about equal quantities. The nonphosphate minerals in this zone, which are separated from the desired mineral in subsequent beneficiation operations in the Florida operations, consist of about one-third fluoapatite, about one-third very finely divided clays (primarily attapulgite and montmorillonite), and about one-third finely divided quartz. The matrix, unlike the overburden, is characterized by poor drainage properties, due to the very fine state of subdivision and type of the clay minerals. It is of some interest that clay chemists associate the formation of attapulgite and montmorillonite with poor drainage situations.

It will be recognized that the stable soil profile, characterized by an overburden having good drainage characteristics and an underlayer having poor drainage characteristics, is of necessity upset in the normal mining procedures. Proposals to dispose of the slimes by flocculating and dewatering followed by use as landfill at the uppermost soil horizons do not restore this profile. Nor do presently practiced methods of storing the slimes in ponds and behind dams. In any case, due to the poor drainage characteristics of composites that contain substantial quantities of slimes solids, disposition of these at or near ground level will tend to form boggy areas. While such disposition could represent an improvement over present practices, the land areas so formed can be expected to have limited subsequent usefulness for agriculture. It would be most desirable to dewater the slimes and to dispose of them at a low horizon, overlaying the solids with overburden, thus restoring the original stable soil profile. In the absence of a method for flocculating and dewatering the slimes economically, such land reclamation until now has not been practiced.

It is an object of this invention to provide means for ameliorating the phosphate slimes waste problem.

It is another object of this invention to provide economic means for flocculating phosphate slimes waste.

It is another object of this invention to efficiently produce clear water from phosphate slimes waste.

It is another object of this invention to reclaim arable land in an area that has been mined to recover phosphate rock.

It is another object of this invention to restore the stable soil profile of an area mined to recover phosphate rock.

Other and additional objects of this invention will become apparent from a consideration of this entire specification including the claims thereof.

BRIEF SUMMARY OF INVENTION

It has now been discovered that the natural, extractable organic matter of fertile topsoil is a highly effective flocculating agent for phosphate slimes waste. Furthermore, the flocs produced tend to be small in size relative to those produced when synthetic flocculants are used. Due to the small size, and perhaps also to other properties, the freshly formed dispersion of flocs can be pumped, and will flow and distribute evenly over a large area with minimum tendency to segregate. These properties provide obvious engineering advantages, yet they do not interfere with the rapid sedimentation and separation of clear water when the flocculated mixture is allowed to remain quiescent.

It is to be understood that the unflocculated phosphate slimes waste, as produced with a solids content of from about 1% to about 5% solids, cannot be effectively used or disposed of due to the stability of the colloidal suspension. Indeed, its only use so far has been to provide some recycle water since after storage in ponds for about one month it will concentrate to about 10% solids during which time some recycle water may be decanted.

By contrast, the flocculated mixture of phosphate slimes waste and extractable organic matter of fertile topsoil can be effectively and rapidly dewatered to high solids content by a variety of techniques as will hereinafter be described. Thus, the flocculated mixture is per se a useful product since it can provide greater quantities of recycle water than the unflocculated slimes waste. The solids recovered from the flocculated mixture may be used as agricultural landfill, as hereinafter described. The recovered solids are most preferably used as landfill to support redistributed overburden, thereby restoring the original stable soil profile. In any case, the practice of this invention results in a reduced volume of slimes waste with the consequence that the now required above-ground storage capacity is either reduced or entirely eliminated.

DETAILED DESCRIPTION OF INVENTION

The extractable organic matter of the present invention refers to that found within the fertile topsoil layer of the overburden, and in particular it refers to the organic matter extracted by contact with water at ambient temperatures. For the purpose of this invention, the fertile topsoil layer means that portion of the overburden which includes at least the uppermost two foot depth of soil, and which is further characterized by an average content of at least 200 parts per million of extractable organic matter as determined by a test to be described in later paragraphs. If the test as described reveals a content of 420 parts per million, for example, it is evident that the fertile topsoil extends at least to a depth of 4 feet, since a representative sample over this depth will contain at least 200 parts per million. On the other hand, if the test as described reveals only 150 parts per million, there is no available fertile topsoil within the meaning of this invention since horizons below the 2-foot level cannot be expected to correct the deficiency in the uppermost 2 feet. Thus, where fertile topsoil is available, it may be expected to vary in depth, but in no case to extend less than 2 feet. The depth of the fertile topsoil usually will be less than that of the overburden, but in some cases the two may be the same.

In general, fertile topsoils will be found over areas that actively support the growth of vegetation. These soils generally are relatively rich in humic substances, soil bacteria and root hairs, and tend to be tan to deep brown or even black in color. Topsoils of poor fertility, as evidenced by the absence or sparseness of vegetation and by a white or near-white color, will generally contain less than 200 parts per million of extractable organic matter and will be unsuitable for this invention.

The determination of extractable organic matter is best carried out by chemical methods on a representative sample of topsoil. A technique suitable for this determination is described in the following paragraphs.

A representative sample of topsoil is obtained by combining, for example, twenty samples of about 100 grams each taken at about 6 inches and 16 inches below the surface at ten different locations spaced over the area being examined. Samples should be taken on any rain-free day immediately following one week during which a total of not more than one inch of rain has fallen. After removing large pebbles and other gross matter, the samples are tabled, i.e., mixed together thoroughly and spread on a table in the form of a circle. The tabled sample is then quartered, i.e., divided into four quarters, three quarters are discarded, and the remaining quarter is itself tabled and quartered. After discarding three quarters, the remaining quarter, about 250 grams, is used as representative sample. In this procedure for obtaining a representative sample, care should be taken to avoid excessive drying of the soil.

One hundred grams of representative sample of soil is slurried with 250 ml of distilled water at 30° C. If the pH of the suspension as measured with a glass electrode is less than 8, it is adjusted to a pH of at least 8 but less than 9 by adding 0.1 N NaOH. The suspension, at the prescribed pH, is stirred under a nitrogen gas blanket for one hour. It is then filtered to separate the extracted soil from the extract. The extracted soil is dried in an oven at 125° C to obtain the weight of dry soil sample, and the extract volume is adjusted for water calculated to be present in the representative sample. For example, if the weight of dry soil sample is 82 grams, 100−82, or 18 grams of water was present in the representative sample, and the adjusted extract volume is 250 + 18 = 268 ml. It is intended that calculations of extractable organic matter be based on the weight of dry soil sample and the adjusted extract volume.

The organic matter content of the extract may be determined in one of several ways. For example, the extract may be evaporated to dryness and the residue weighed. If there is some question that a significant portion of the residue is inorganic, the residue may be ignited to burn away the organics and reweighed. However, because the amount of soluble organic matter usually is small, it is preferred to use a combustion technique to convert the organic matter to carbon dioxide which is then determined by infra-red spectrometry. Such techniques are sensitive and accurate, and well known in the art of water analysis. A suitable procedure is described in "Standard Methods for the Examination of Water and Wastewater", 13th Edition, pages 257–9, published jointly by: American Public Health Association; American Water Works Association; and, Water Pollution Control Federation (1971). The method need not be described here in detail, but briefly, it consists of injection of a micro aliquot of the extract, diluted, if necessary, into a heated packed tube in a stream of oxygen. The water is vaporized and the organic matter oxidized to carbon dioxide, which is measured by an infra-red analyzer. The results are usually computed as milligrams of carbon per liter of sample, which should be multiplied by the factor 1.724 to convert this figure to milligrams of organic matter per liter of sample. This value, together with the weight of dry soil sample and adjusted extract volume, assumed to have a density of 1.00, are used to calculate parts of extractable organic matter per million parts of dry soil sample.

The phosphate slimes wastes that may be treated by the method of this invention include: freshly produced slimes that have a solids content between about 1 and 5 weight percent; slimes that have been sedimented by storage in ponds or concentrated by other means, and which by virtue of such treatment have a solids content between about 5 and about 10 weight percent; or older slimes which have been allowed to sediment and concentrate for a number of months to a number of years, and which may have solids content from about 10 to about 20 weight percent. It is preferred, for the purpose of this invention, to use either freshly produced or aged slimes wastes that have a solids content from at least 2 to about 12 weight percent. The reason for this is that fluidity is required to provide effective mixing of the phosphate slimes waste with a soluble organic matter of the overburden, and slimes that have a solids content in excess of about 12 percent have a gel-like consistency which renders mixing and pumping difficult. However, with a pug-mill or other suitable device, slimes with higher than about 12 weight percent solids may be repulped with water, with a slurry of fertile topsoil, or with an extract of fertile topsoil to restore fluidity. Slimes with less than 2 weight percent solids should be allowed to sediment to at least 2 weight percent solids since flocculation is inefficient with excessive dilution.

For the practice of this invention, sufficient extractable organic matter is added to the phosphate slimes waste to provide a concentration in the final mixture of from 50 to 500 parts per million. It is to be recognized that the exact quantity that will be found effective will vary depending on the relative amounts of different clays in the slime, the season of the year, the particular location from which the fertile topsoil is derived, and to some extent the history of the fertile topsoil. In the normal history of a soil decayed organic matter is being formed continually by the normal biological and oxidative processes, and a portion of the organic matter is continually being removed by similar processes including leaching by rainfall. In brief, the extractable organic matter may be said to be in dynamic equilibrium and its content in the fertile topsoil and its effectiveness may vary with time and location. In general, providing less than 50 parts per million of extractable organic matter in the final mixture with a phosphate slimes waste will produce little or poorly formed floc, while quantities in excess of 500 parts per million will produce little additional flocculation effect.

One method for providing the extractable organic matter of fertile topsoil is to mix the fertile topsoil itself with the phosphate slimes to form a flocculated mixture. The proportions of these two ingredients will be dictated at least in part by the assay of extractable organic matter in a representative sample of the topsoil. For example, a fertile topsoil found to have 350 parts per million of extractable organic matter should be added at a dosage of at least one ton per six tons of slime, to provide at least 50 parts per million in the final flocculated mixture. No special preparation of the fertile topsoil is contemplated prior to its use in this invention other than separation of objects that might interfere with the operation of earth-moving or pumping equipment. All, or only a portion of the fertile topsoil may be segregated from the balance of the overburden by the dragline operator. These may be segregated as two separate ridges. Or, the fertile topsoil may be directly scooped up and fed to a well that contains the slimes to be flocculated. Mixing can be effected by mechanical or by hydraulic means. A pile or ridge of fertile topsoil may be fluidized by appropriately placed jets of slime and conveyed to the desired location by sluice or conduit. Regardless of the particular method or equipment used to add and mix the fertile topsoil with the slime, it is important that the two components be proportioned to provide at least 50 parts per million by weight of extractable organic matter in the total flocculated mixture. The addition of fertile topsoil as a source of extractable organic matter is believed to provide an advantageous mode of operation. Such mixtures dewater very rapidly, in a month or less, and form deposits with good bearing strength. Also, a large portion of the slimes become trapped by the fertile topsoil particles and settle with it.

In a second mode of operation, the fertile topsoil may be contacted with water to form an aqueous extract containing the extractable organic matter. This aqueous extract, separated from the fertile topsoil, is added to slimes wastes to form a flocculated mixture. One way of doing this, for example, is to hydraulically slurry the topsoil to about 30 percent solids concentration and to pump and hydraulically place the slurry on a reclamation area. The aqueous extract is then recovered by one or more of the well-known methods including drainage, decantation or siphoning. The recovered aqueous extract of fertile topsoil is added to the phosphate slimes waste in an amount sufficient to provide at least 50 parts per million of extractable organic matter in the final mixture, and mixed therewith to induce flocculation. Addition and mixing may be conducted simultaneously. It is desirable that such extract, in the practice of this invention, contain at least 100 parts per million of extractable organic matter in order to not unduly dilute the phosphate slimes waste.

It is important to note that when a water solution as described in the preceeding paragraph is used to provide the extractable organic matter, the solution should be used within a relatively short time after it is collected, preferably within one month. This is so because we have found that the effectiveness of such solutions in flocculating phosphate slimes wastes deteriorates with time of storage, and indeed, after storage of about one year, becomes completely ineffective. The reasons for this are not understood. It is known that aqueous extracts of soils are complex mixtures, of which the major organic constituents are fulvic acids and humic acids. It is reasonable to assume that these are the effective flocculating agents of this invention; and, being carboxyllic acids, that they lose effectiveness on long-term storage due to chemical decarboxyllation or microbial degradation.

It is obvious that combinations of the above techniques may be used to prepare flocculated mixtures; that is, a portion of the extractable organic matter of fertile topsoil may be provided by incorporating the overburden itself in less than the required quantity, the remainder being provided by adding a water extract of fertile topsoil to produce the flocculated mixture of this invention.

Furthermore, it may sometimes be desirable to add quantities of other materials to the slimes in addition to the extractable organic matter. Small quantities of surface active agents, or other adjuvants including synthetic flocculating agents such as partially hydrolyzed polyacrylamide, which may cause the floc to be more efficiently handled in subsequent operations, may be used. Also, small quantities of acidic substances such as hydrochloric and sulfuric acids, or bases such as sodium and calcium hydroxides, may be found useful additions to the various operations described to induce small changes in the pH of system. Such small changes, although not required for the practice of this invention, sometimes will be found to enhance the benefits derived therefrom.

A particularly useful variant of the present invention is to incorporate dewatered tailings in the slime, as described in detail in U.S. Pat. No. 3,763,041, to increase the bearing strength when used in conjuction with reclaiming arable land as will hereinafter be described. Sandy overburden also may be incorporated with similar results.

It is contemplated to practice this invention with a portion of the plant slimes waste if insufficient fertile topsoil is available to treat all of it, or if for economic or other reasons it is desired to treat only some fraction of the waste. In such instances, the plant slimes waste is divided into the portion to be treated and a remaining portion, either on a continuous basis or by periodically diverting the waste to and away from the flocculation process. Even when a portion of the waste is treated, substantial benefits in the total mining operation results since the volume of above-ground storage required is either reduced or eliminated.

Regardless of which particular embodiment above described is employed, the results of mixing extractable organic matter of fertile topsoil with the phosphate slimes waste is to produce a flocculated mixture. The primary characteristic of this flocculated mixture, which comprises agglomerates of slime, i.e., floc particles, suspended in water, is the ease with which the floc particles can be separated from clear water. Whereas the phosphate slimes waste before flocculation could not be readily sedimented, filtered, or otherwise handled to remove or concentrate the solids with recovery of most of its water, after flocculation as herein taught the mixture produced is readily separable into clear or low solids content water and concentrated solids by entrapment, filtration, sedimentation, centrifugation, and combinations of these or other means. Looked at in another way, whereas the original, untreated phosphate slimes waste is essentially a liability in the mining process, the flocculated mixture is a useful means for reducing or eliminating the need for above-ground storage, i.e., for ameliorating the slimes disposal problem and concomitantly providing increased quantities of water suitable for recycle or discharge.

One manner of utilizing the flocculated mixture of this invention is to store it in a quiescent state, i.e., without deliberate agitation other than that caused by wind, for a period of from 24 hours to about one month, in a pond or a settling area. During such storage very effective sedimentation will occur with the copious formation of supernatant clear water that can be separated and returned for use in the mining process, for example, or discharged to a river. Because the flocculated mixture will provide more clear water than the untreated slime, the area required to store the slimes will be substantially less than for untreated slimes.

A more effective method of dewatering the flocculated mixture is to dispose it on a porous filter bed. Such a bed could be constructed, for example, on a layer of gravel dressed with dewatered tailings. The flocculated mixture so disposed will sediment and clear water is recovered by decantation and drainage. In this manner, a partially dewatered floc of high solids concentration is rapidly formed, and if desired, it may be transferred from the sand bed for use as land-fill. However, in the case of flocculated mixtures produced with fertile topsoil, it is preferred to hydraulically place the fluid mixture on its terminal site since it has been found that hydraulic placement results in a greater consolidation of the deposited solids than is achieved by mechanically depositing non-fluid mixtures.

Mechanical devices, such as screens, porous belts, centrifuges and such also may be used to dewater the flocculated mixture to a greater or less degree, as desired.

Regardless of the techniques used to arrive at a partially dewatered floc of semi-solid consistency, i.e., one which contains greater than about 15% by weight of original slimes solids, such floc may be further rapidly dewatered by subjecting it to pressure while it is mechanically constrained within at least one highly porous barrier. For example, the floc may be compressed in a plate and frame filter press. Or, it may be pressed against a wire screen. A particularly preferred technique is to cover the partially dewatered floc with a substantial layer, i.e., a layer at least one foot thick, of dewatered tailings or sandy overburden. In this instance the layer of porous mineral becomes the mechanically constraining, highly porous barrier, and the pressure is supplied by the weight of the layer itself. When utilized with floc deposited over a substantial land area, the technique described together with drainage, decantation or siphoning of the expressed water leads to the formation of reclaimed land areas with good bearing properties. i.e., land areas capable of supporting farm machinery and buildings.

A particularly preferred method for utilizing the flocculated mixture of this invention is to pump and distribute the mixture in mine pits that have been appropriately graded and provided with drainage means, such as a layer about 6 inches thick of dewatered tailings, and provided with pumps or gravity means for removing drained and decantable water from the area, and allowing the formation of partially dewatered floc. Thereafter, by weighting the partially dewatered floc with tailings and/or overburden, as above described, and providing means for removal of expressed water from the site, the floc will acquire good bearing properties. Thereafter, more overburden is spread by dragline or other method to provide a layer of at least 2 feet in thickness, which optimally may be topped finally with fertile topsoil. It will be recognized that this sequence of operations results in disposal of the slimes waste with restoration of the stable soil profile consisting of an overburden having good drainage characteristics and an underlayer having poor drainage characteristics. It will be recognized that such land areas are eminently suitable for growing crops, trees, or other vegetation, and can be worked with tillers, plows and other farm machinery, i.e., by the method of this invention arable land areas may be reclaimed.

The method for flocculating slimes wastes and the utilization of the flocculated mixtures is further illustrated by the examples which follow, but this invention is not limited thereto.

EXAMPLE 1

Overburden was excavated by a dragline and dropped into a well where it was slurried to about 30% solids concentration with water and pumped to a settling area. This test was conducted over a 3 month period for about 50 hours operating time pumping slurry at an average 10,500 gallons per minute. The runoff water from the hydraulically placed overburden had a brown color and contained no clays. It did contain 186 parts per million of organic matter. A portion of this runoff water was collected

EXAMPLE 2

100 milliliters of a typical phosphate slimes waste having a solids content of about 3 weight percent was divided into two 50 milliliter portions. One portion was mixed with 50 milliliters of distilled water. The other portion was mixed with 50 milliliters of the brown runoff water of Example 1 to form a flocculated mixture. Two sand filters were prepared using about one inch diameter glass tubes constricted at one end. About 2 inches of clean sand retained by glass wool was placed in each tube. The diluted slimes and the flocculated mixture were poured into the separate tubes and the filtrate was collected. The flocculated mixture passed through the filter in one third the time required for the control, and the filtrate was clear and colorless. The slimes solids were retained on the sand bed. The sand bed, in contrast, did not entrap the clay in the distilled water diluted mixture which passed through the filter unchanged.

EXAMPLE 3

Fertile topsoil was mixed with plant slimes by sluicing up the topsoil using a hydraulic "gun". The slurry was pumped at about 6000 gallons per minute for a total time of 9¼ hours over a two-day period and deposited on a reclamation area. The plant slimes taken from the slimes pipeline averaged about 3.5 wt. % solids and the slurry averaged about 30 wt. % fertile topsoil. A material balance for this test showed that about one half the slime solids contained in the phosphate slimes stream were entrapped in the interstices of the settled fertile topsoil. The runoff water was clear and could be recycled without difficulty.

The density of the hydraulically placed fertile topsoil and entrapped floc was substantially greater after one month than was expected from separate settling tests made with the topsoil alone or the untreated slimes waste.

EXAMPLE 4

A test similar to that described in Example 3 was conducted except that overburden deficient in extractable organic matter was used together with settled slimes rather than plant slimes. In this test the settled slimes were pumped from a settling area and deposited in a well at another location. Severe pumping problems occurred at the suction of the settled slimes pump. The starvation of the suction was related to the thixotropic, gel properties which retarded flow to the suction. As a result of this, the slime concentrations pumped to the slurrying well varied between 0 and 4 wt. % solids averaging less than 2 wt. % solids over the course of the experiment. Overburden was excavated by the dragline and dropped into the well where it was slurried with the settled slimes using a manually operated hydraulic gun. From the well, the slurry was pumped to another location and deposited.

No entrapment of slimes solids took place in the stacked solids which, however, rapidly acquired good bearing strength. Also, over a six month period, the small amount of slimes in the stacked solids was leached out due to the washing action of rainwater. The runoff water showed a turbidity of about 250 Jackson units, and was judged not suitable for recycle or discharge into streams.

What I claim is:
1. A method for reclaiming arable land in areas hydraulically mined to recover phosphate rock, and in which mining process segregated overburden, exhausted mine pits, quartz sand tailings and fluid phosphate slimes waste are formed, wherein the improvement comprises:
   admixing fluid phosphate slimes waste with a flocculant to produce a flocculated mixture, said flocculant comprising the extractable organic matter of fertile topsoil;
   depositing said flocculated mixture in a mine pit;
   separating water from said deposited flocculated mixture thereby producing a layer of dewatered floc; and
   depositing overburden on top of said layer of dewatered floc, whereby to restore the original stable soil profile of an uppermost sandy layer with good drainage supported on a lower clay-rich layer with poor drainage.
2. The method described in claim 1, including the steps:
   depositing on said dewatered floc, produced from said separation of water, a layer at least one foot thick of quartz sand tailings, and
   separating additional water prior to depositing said overburden.

* * * * *